United States Patent
Menzel et al.

(10) Patent No.: US 6,600,731 B2
(45) Date of Patent: Jul. 29, 2003

(54) METHOD AND BASE STATION SYSTEM FOR CALLING MOBILE STATIONS FOR THE TRANSMISSION OF PACKET DATA

(75) Inventors: Christian Menzel, Maisach (DE); Martin Öttl, Weilheim (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/380,018

(22) PCT Filed: Jan. 26, 1998

(86) PCT No.: PCT/DE98/00229

§ 371 (c)(1),
(2), (4) Date: Aug. 23, 1998

(87) PCT Pub. No.: WO98/38818

PCT Pub. Date: Sep. 3, 1998

(65) Prior Publication Data

US 2003/0117990 A1 Jun. 26, 2003

(30) Foreign Application Priority Data

Feb. 24, 1997 (DE) .......................... 197 07 261

(51) Int. Cl.⁷ .............................................. H04B 7/212
(52) U.S. Cl. ...................... 370/347; 370/442; 370/444; 370/468
(58) Field of Search ................. 370/310, 321, 370/337, 347, 322, 348, 477, 498, 431, 437, 442, 443, 444, 336, 345, 468; 455/450, 452

(56) References Cited

U.S. PATENT DOCUMENTS 5,404,355 A * 4/1995 Raith .................... 370/347
5,729,541 A * 3/1998 Hamalainen et al. ........ 370/337
6,031,832 A * 2/2000 Turina ........................ 370/348

FOREIGN PATENT DOCUMENTS

| DE | 44 02 903 A1 | 8/1995 |
| DE | 195 24 659 C1 | 10/1996 |
| EP | 0 687 078 A2 | 12/1995 |
| WO | WO 94/05103 | 3/1994 |
| WO | WO 95/12931 | 5/1995 |
| WO | WO 95/16330 | 6/1995 |
| WO | WO 95/32589 | 11/1995 |

OTHER PUBLICATIONS

Akesson, GPRS, General Packet Radio Service, IEEE, pp. 640–643, 1995.*

Scourias, Overview of GSM: The Global System for Mobile Communications, University of Waterloo, pp. 1–26.*

Brasche, G., "Evaluation of a MAC Protocol Proposed for a General Packet Radio service in GSM", IEEE Symposium on Personal, Indoor & Mobile Radio Communications, vol. 2, (1996), pp. 668–672.

* cited by examiner

Primary Examiner—Dang Ton
Assistant Examiner—Frank Duong
(74) Attorney, Agent, or Firm—Staas & Halsey LLP

(57) ABSTRACT

In order to call mobile'stations, mobile stations are, according to the invention, allocated to time slots for calling on the basis of subscriber-specific profiles. The number of time slots allocated for calling within a macroframe can be set individually for the mobile, stations. The requirement for time slots allocated for calling is thus covered individually for each mobile station. For time-critical applications, shorter delay times can be achieved using the method according to the invention.

18 Claims, 3 Drawing Sheets

DOWNLINK DIRECTION

METHOD AND BASE STATION SYSTEM FOR CALLING MOBILE STATIONS FOR THE TRANSMISSION OF PACKET DATA

BACKGROUND OF THE INVENTION

1. Field of the Invention

The invention relates to packet data transmissions between mobile and base radio stations, and more specifically to a method and system for calling mobile stations in a mobile radio network.

2. Description of the Prior Art

Connection-oriented concepts and concepts based on logic links may be used for transmitting data between two communications terminals. In the case of connection-oriented data transmissions, physical resources must be provided between the two communications terminals throughout the entire time of data transmission.

When transmitting data via logic links, there is no need for any permanent provision of physical resources. One example of such a data transmission is packet data transmission. In this case, there is a logic link between the two communications terminals throughout the duration of the overall data transmission, but physical resources are provided only during the times when data packets are actually being transmitted. This method is based on the data being transmitted in short data packets, between which relatively long pauses may occur. The physical resources are available for other logic links in the pauses between the data packets. The use of a logic link saves physical resources.

The packet data transmission method which is known from German Patent DE 44 02 930 may be used in particular for communications systems with limited physical resources. For example, in mobile radio systems such as the GSM mobile radio system (Global System for Mobile Communications), the physical resources in the frequency domain—the number of frequency channels and time slots—are limited and must be used economically.

The GSM mobile radio system is one example of a time-division multiplex mobile radio system, in which time slots within a frequency channel may be split between different communications terminals. The radio station at the network end of a mobile radio network is a base station, which communicates with mobile stations via a radio interface. Transmission from a mobile station to the base station is called the uplink direction, and transmission from the base station to a mobile station is called the downlink direction. A channel, which is reserved for packet,data transmission, is formed by at least one time slot per time-division multiplex frame. A plurality of time-division multiplex frames in this case form a macroframe. Furthermore, the channel is governed by the carrier frequency and, possibly, by a frequency jump sequence.

The GSM mobile radio system was originally designed for voice transmission, although one channel was reserved for continuous information transmission between the mobile station and base station. However, for packet data transmission, a common packet data channel is used for packet data transmission for a plurality of mobile stations.

If one wants to transmit data from the network to the mobile station, that is to say, in the downlink direction, this mobile station is called by the network via the base station system (paging). To do this, time slots for calling are provided within the packet data channel, time slots for signalling messages, are required to set up a call, but no useful data are transmitted.

In this scheme the time interval between two successive call possibilities is the same for all mobile stations. But the waiting time between two successive call possibilities is too long for applications which require immediate data transmission.

SUMMARY OF THE INVENTION

In consequence, the invention is based on the object of specifying an improved method and an improved base station system for calling mobile stations in a mobile radio network. This object is achieved by the method having the features of forming a packet data channel by at least one time slot per time-division multiplex frame; forming a macroframe from a plurality of time-division multiplex frames; carrying out said packet data transmission from a plurality of said mobile stations via a common said packet data channel; providing at least one time slot for calling said mobile stations at cyclical intervals in said packet data channel; and setting a number of said time slots allocated within said macroframe for said mobile stations individually, where said.mobile stations are allocated to time slots for calling on the basis of subscriber-specific profiles and by the base station system having the features of a packet data channel that is formed by at least one time slot per time division multiplex frame; a macroframe that is formed by a plurality of time-division multiplex frames; a packet data transmission from a plurality of said mobile stations that are carried out via a common said packet data channel; at least one time slot for calling said mobile stations that is provided at cyclic intervals in said packet data channel; a control device for calling said mobile stations, said control device allocating said mobile stations to time slots for calling on the basis of subscriber-specific profiles, wherein a number of said time slots allocated within said macroframe for said mobile stations is set individually.

According to the invention, in the case of the method for calling mobile stations, mobile stations are allocated to time slots for calling on the basis of subscriber-specific profiles. The number of time slots allocated for calling within a macroframe can be set individually for the mobile stations.

This allows the requirement for time slots allocated for calling to be covered individually for each mobile station. For time-critical applications, shorter delay times can be achieved using the method according to the present invention. The number of time slots allocated for calling is governed on the basis of subscriber-specific profiles which are stored at the network end and/or at the mobile station end, and are signalled when required between the mobile station and the base station system.

According to an advantageous refinement of the invention, a plurality of groups are formed for calling mobile stations. A mobile station is allocated to one of these groups, and the groups can be allocated different numbers of time slots for calling within one cycle. The signalling complexity to form such groups is low, and group formation therefore allows the individual requirements of the mobile stations to be met quickly. Furthermore, it is advantageous if a mobile station is allocated to a plurality of groups at the same time. This allows a reduced delay time when calling to be achieved very easily for this mobile station.

According to an advantageous development of the invention, the association with the groups is signalled to the mobile stations by the base station. In this way, a changed requirement from the mobile station is satisfied quickly, flexibly and with only a small amount of signalling complexity.

The changed requirement is advantageously signalled by the mobile station to the base station system by changing its subscriber-specific profile, and the base station system then changes the mobile station's allocation of time slots for calling. Subscriber-specific profiles, which may also be used for other resource allocations in a subsequent useful channel allocation, are particularly suitable as a criterion for the requirement for time slots for calling. Each mobile station may be allocated a specific profile independently of other mobile stations, and, in the process, the resource allocation by the base station system can be optimized, taking into account all of the mobile stations to be supplied.

In order to reduce the delay times for the mobile stations further, time slots for useful data transmission are also used as time slots for calling. One or more mobile stations may additionally be called via these time slots. The interval between two time slots for calling is thus shortened. Abbreviated identifiers which are transmitted in the time slots for useful data transmission expediently indicate the presence of calls for the mobile stations.

For mobile stations in which the time delays for a call are not critical, a long interval (possibly a number of seconds) may be set by a suitable allocation of time slots for calling. A mobile station can thus be switched between the time slots allocated to it for calling, in an energy-saving mode, reducing energy consumption of this mobile station and allowing relatively long operating times before the battery needs to be recharged. However, the application of the method according to the invention is not just limited to mobile called radio stations. The called mobile station may also be stationary.

According to advantageous further developments of the invention, the subscriber-specific profiles are designated by different qualities of service. These qualities of service are, for example, for the GSM mobile radio network, standardized identifiers of a packet data transmission which can also easily be used for the method according to the invention. As an alternative to this, the subscriber-specific profiles are designated by different services used by the mobile station. The delay which is still acceptable or even desirable can easily be determined as well on the basis of the service to be used, for example E-mail (relatively long delay) or electronic train control (short delay). In addition, it is possible to base the allocation of time slots for calling on the number of mobile stations registered in the radio area of the base station system. This knowledge can be included in an improved allocation strategy.

Further advantageous refinements of the subscriber-specific profiles are designated by different priorities, by different permissible delay times or by different required data rates for packet data transmission. The permissible intervals between two time slots allocated to the respective mobile station for calling may be read directly from these values.

BRIEF DESCRIPTION OF THE DRAWINGS

The invention will be explained in more detail in the following text with reference to exemplary embodiments and by using illustrative drawings, in which.

DESCRIPTION OF THE PREFERRED EMBODIMENT

Figure 1:
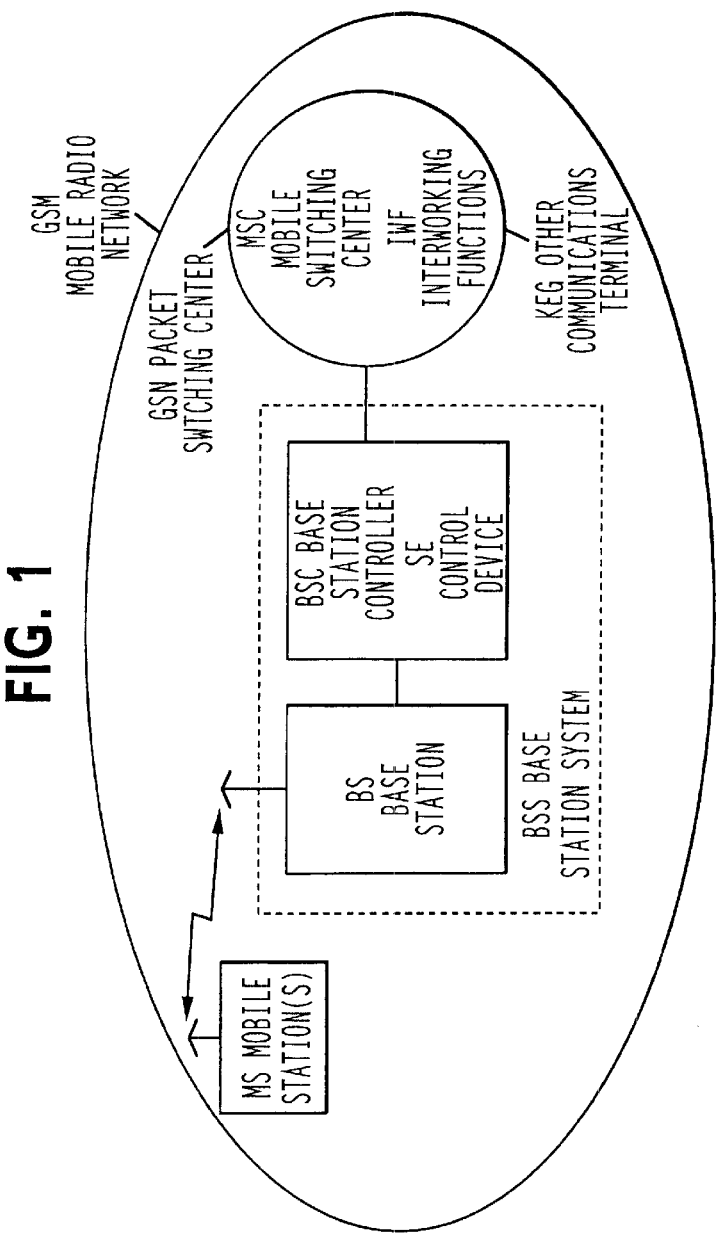
FIG. 1 is a block diagram of a time-division multiplex mobile radio system for packet data transmission.

The time-division multiplex mobile radio system according to FIG. 1 is, for example, a GSM mobile radio network GSM which contains at least one base station system BSS having a base station controller BSC and a base station BS. Mobile stations MS are located in the radio area of the one base station BS illustrated. The base station system BSS produces the link to other devices in the GSM mobile radio network GSM. The base station controller BSC contains a control device SE which allocates radio resources for the mobile stations MS. However, the control device SE may also be contained in other devices in the mobile radio system.

These other devices are, for example, a mobile switching center MSC and a unit for providing inter working functions IWF. The interaction of a mobile switching center MSC and interworking functions IWF results in a packet switching center, which is also called a GSN (GPRS support node). This packet switching center is connected to an MSC for voice switching, but alternatively could be a remote, dedicated unit.

The GSM mobile radio network GSM may be connected to other communications networks. By way of example, another communications terminal KEG can be connected to the GSM mobile radio network, or may even be a component of this GSM mobile radio network GSM.

The GSM mobile radio network GSM is intended to be used for packet data transmission in parallel with the known voice transmission. In this case, the device for producing interworking functions IWF may produce the coupling of the GSM mobile radio network GSM to data transmission networks and thus for the other communications terminal KEG.

Figure 2:
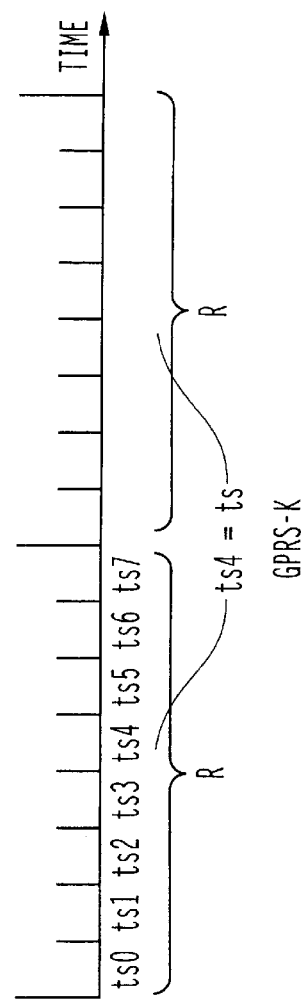
FIG. 2 is a diagram showing a frequency channel using time-division multiplex.

The radio interface between the mobile stations MS and a base station BS is characterized by a frequency and at least one time slot ts. According to FIG. 2, for example, eight time: slots ts (ts0 to ts7) are combined to form a frame R. The frame R is repeated cyclically, a recurring time slot, for example the time slot ts=ts4, belonging to one channel. This time slot ts is used in the following text as the channel GPRS-K for packet data transmission for the purpose of the GPRS (General Packet Radio Services) service. A plurality of time-division multiplex frames R may be combined to form a macroframe.

If a mobile station MS intends to use this service, then, in accordance with the GSM terminology, it makes a random access using a short, so-called access burst, and changes to a dedicated control channel. This is followed by authentication and setting of the context for a logic link (standby state). If the other communications terminal KEG intends to communicate with a mobile station MS via the packet data service, the desired mobile station MS is called (paging) and the indicated random access takes place, at the network end.

For another packet data transmission in the downlink direction, the mobile station MS is allocated an abbreviated MS identifier and the corresponding GPRS channel GPRS-K. The timing advance and the reception level in the base station BS are then defined at the network end. Four successive time slots T are then transmitted as a packet data block TCH in the downlink direction to the mobile station MS designated by the abbreviated MS identifier.

The calling of a mobile station MS is illustrated with reference to FIGS. 3 and 4, three macroframes in each case being combined to form a higher-order frame.

Four time slots T for packet data transmission are in each case combined with time slots PPCH for calling to form a packet data block TCH or a block PC1, PC2, PC3, PC4. Three such packet data blocks TCH and one time slot A, or I for signalling are repeated four times to form a macroframe, which comprises 52 frames R. A macroframe lasts for 240 ms.

The information in a packet data block TCH is interleaved with four time slots T. The allocation of packet data blocks TCH to different mobile stations MS is carried out flexibly in the uplink and downlink directions to one or more mobile stations MS. Different data rates may therefore be used. Priorities may be used to distinguish between the mobile stations MS for access to the GPRS channel. The application of packet data blocks TCH while a logic link is in existence takes place in the band, that is to say, within the packet data blocks TCH, indicator messages are used to indicate to the mobile stations MS which of them may use the following packet data blocks TCH.

four successive time slots T for packet data transmission are interleaved in the downlink direction. The intermediate time slots I are used for measurements relating to the mobile stations MS in adjacent cells, and the time slots A are used for signalling. The sequence of time slots A, I for signalling and adjacent channel measurement may be based on different sequences, for example A/I=1/1.

According to a first exemplary embodiment, all the mobile stations MS are allocated to a common group for calling mobile stations MS. The blocks PC1, PC2, PC3 and PC4 with time slots PCCH for calling are used for calling.

These blocks PC1, PC2, PC3 and PC4 are allocated on the basis of subscriber-specific profiles for the mobile stations MS. The subscriber-specific profiles are formed by quality of service classes QoS 1 to 4, the average delay times (transfer delay), which comprise a delay in the uplink and downlink directions, and the data rates that can be transmitted respectively being defined for the quality of service classes QoS. A quality of service class QoS is defined and stored for the mobile stations MS. The quality of service classes QoS may be changed by appropriate signalling by the mobile station MS or by network presets. As an alternative to the quality of service classes QoS, other criteria, which have already been mentioned above, may be used for the subscriber-specific profiles.

Figure 3:
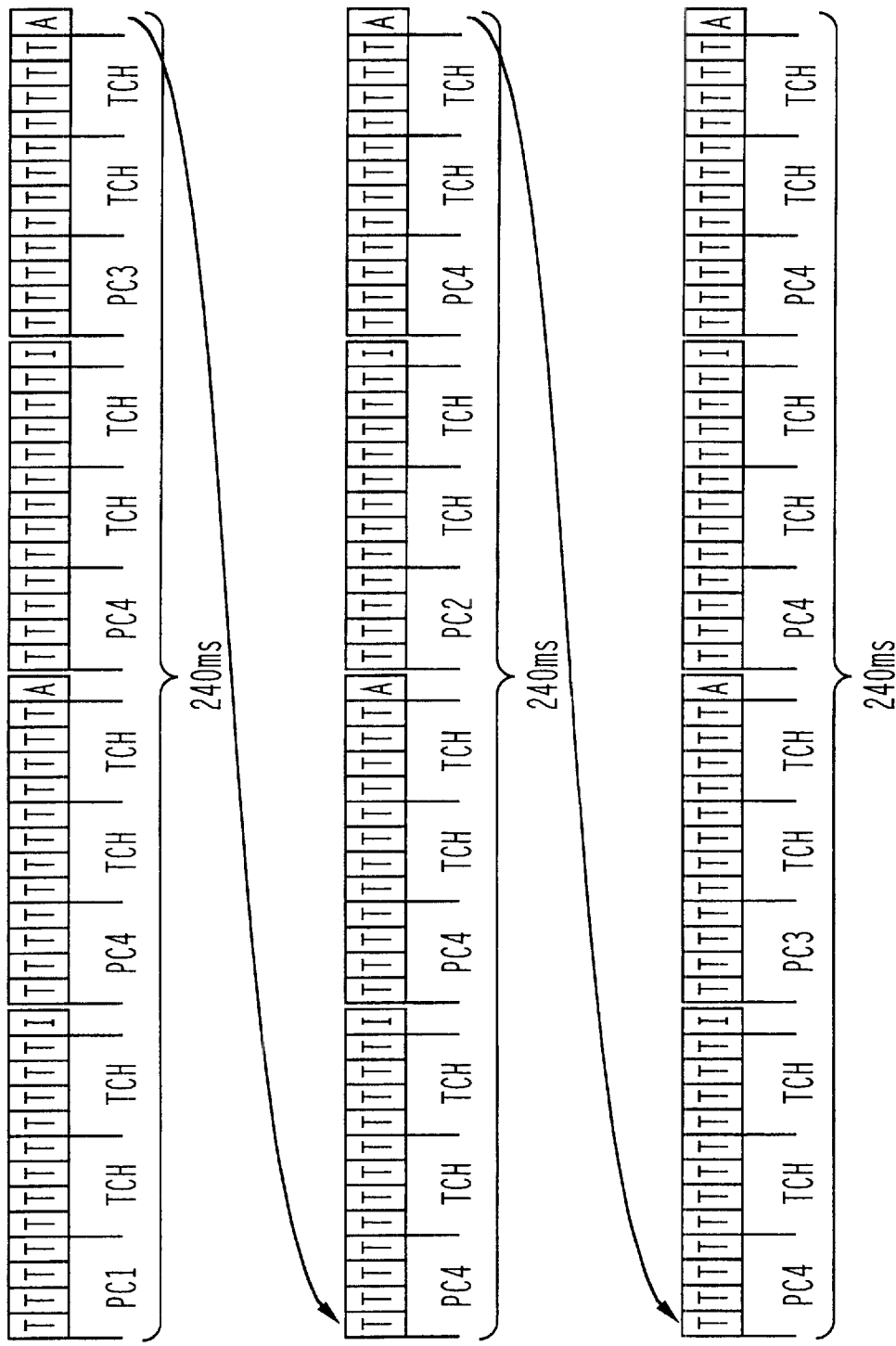
FIG. 3 is a diagram showing the time slots in a channel for a packet data transmission and for a call from mobile stations without group formation.

According to FIG. 3., the blocks PC1, PC2 and PC3 are allocated to mobile stations MS using the quality of service class QoS 2, so that a call is guaranteed within 180 ms. The block PC4 is also allocated to the mobile stations using the quality of service class QoS 1, so that the interval between two calls is reduced by a factor of three to 60 ms for these mobile stations MS. The delay before a data packet is transmitted is thus also reduced for these mobile stations MS. Only the block PC1 is allocated to mobile stations MS for the quality of service class QoS 4, that is to say the lowest priority, the interval in this case is 720 ms. The mobile stations MS for which the interval is 720 ms may, in particular, switch to an energy-saving mode for this time period, providing a considerable energy saving in comparison with more frequent calling. Should one of these mobile stations MS using the quality of service class QoS 4 change to the next higher quality of service class QoS 3, the block PC2 may be allocated in addition. If the base station does not require the blocks PC2, PC3 and PC4 for calling mobile stations, they may be used for useful data transmission.

According to a second exemplary embodiment for calling mobile stations MS, the mobile stations MS are allocated to two groups 1 or 2. The blocks PC1, PC2, PC3 and PC4 with time slots PCCH for calling are once again used for calling.

Figure 4:
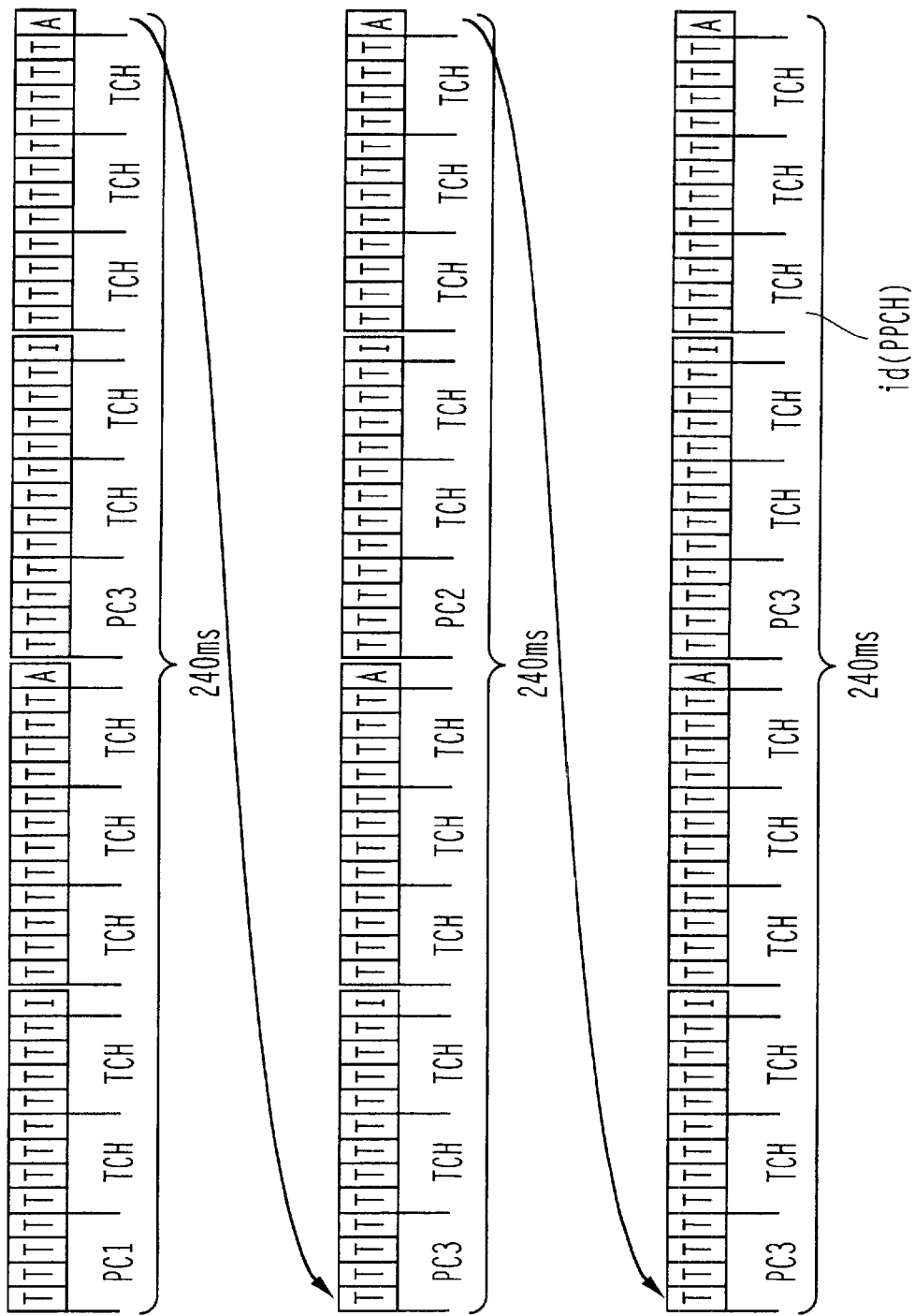
FIG. 4 is a diagram showing the time slots in a channel for a packet data transmission and for a call from mobile stations with group formation.

According to FIG. 4, the block PC1, which is repeated only every 720 ms, is allocated to the mobile stations MS using the quality of service class QoS 4 in the first group 1. The block PC2 is allocated to the mobile stations MS using the quality of service class QoS 4 in the second group 2. Calling occurs rarely for these mobile stations MS.

Mobile stations MS using the quality of service class QoS 3 in both groups 1 and 2 are called in the blocks PC1 and PC2, which results in the interval between two possible calls being halved. The blocks PC1, PC2 and PC3 are used for calling for the mobile stations MS using the quality of service classes QoS 1 and 2, which results in a minimum interval of only 120 ms for these mobile stations MS. If the base station does not require the block PC3 for calling mobile stations, it may be used for useful data transmission.

If it is intended to reduce the interval, and thus the delay, further, then a packet data block TCH for calling may be used. In this case, it may be advantageous for a special abbreviated identifier id (the abbreviated identifiers id are normally used for allocation of packet data blocks TCH to mobile stations MS) to identify the that this block is used for calling. This abbreviated identifier, is signalled in advance to specific mobile stations BS.

Particularly suitable applications include packet-oriented transmission of information via the radio interface for telematics applications, fax and file transmission, point of sales implementations, fleet management and traffic management systems.

I claim:

1. A method for calling mobile stations for a packet data transmission in a time-division multiplex mobile radio system, comprising:
   forming a packet data channel by at least one time slot per time-division multiplex frame;
   forming a macroframe from a plurality of time-division multiplex frames;
   carrying out said packet data transmission from a plurality of said mobile stations via a common said packet data channel;
   providing at least one time slot for calling said mobile stations at cyclical intervals in said packet data channel; and
   setting a number of time slots allocated for calling within said macroframe for said mobile stations individually, where said mobile stations are allocated to said time slots for calling on the basis of subscriber-specific profiles.

2. A method according to claim 1 which further comprises forming a plurality of groups for calling said mobile stations.

3. A method according to claim 2 wherein said forming a plurality of groups further comprises allocating a mobile staton to said plurality of groups at the same time.

4. A method according to claim 2 wherein said forming a plurality of groups further comprises signaling associations with said groups to said mobile stations by a base station.

5. A method according to claim 1 wherein said setting the number of said time slots allocated within said macroframe further comprises:
   signaling to a base station by a mobile station a change to the mobile station's subscriber-specific profile; and
   changing the allocation of said time slots for said mobile station.

6. A method according to claim 1 further comprising of using time slots for useful data transmission for said time slots for calling.

7. A method according to claim 6, wherein said using time slots for useful data transmission for said time slots for calling further comprises the step of indicating the presence of calls for said mobile stations by transmitting abbreviated identifiers in said time slots for useful data transmissions.

8. A method according to claim 1, further comprising switching a mobile station to an energy-saving mode between said allocated time slots for calling.

9. A method according to claim 1 further comprising designating said subscriber-specific profiles by different quality of service classes.

10. A method according to claim 1 further comprising, designating a subscriber-specific profiles by different services used by a mobile station.

11. A method according to claim 1 further comprising designating said subscriber-specific profiles by different priorities.

12. A method according to claim 1 further comprising designating said subscriber-specific profiles by different permissible delay times.

13. A method according to claim 1 further comprising designating said subscriber-specific profiles by different required data rates for packet data transmission.

14. A method as recited in claim 1, wherein a higher priority of a subscriber specific profile results in a higher number of respective time slots set.

15. A base station system for a packet data transmission to and from mobile stations in a time-division multiplex mobile radio system comprising a control device for controlling a radio interface between said base station system and said mobile stations, wherein said radio interface comprises:

a packet data channel that is formed by at least one time slot per time division multiplex frame;

a macroframe that is formed by a plurality of time-division multiplex frames;

a packet data transmission from a plurality of said mobile stations that are carried out via a common said packet data channel;

at least one time slot for calling said mobile stations that is provided at cyclic intervals in said packet data channel;

a control device for calling said mobile stations, said control device allocating said mobile stations to time slots for calling on the basis of subscriber-specific profiles, wherein a number of time slots allocated for calling within said macroframe for said mobile stations is set individually.

16. A system as recited in claim 15, wherein a higher priority of a subscriber specific profile results in a higher number of respective time slots set.

17. A computer readable storage for calling mobile stations for a packet data transmission in a time-division multiplex mobile radio system, controlling a computer by:

forming a packet data channel by at least one time slot per time-division multiplex frame;

forming a macroframe from a plurality of time-division multiplex frames;

carrying out said packet data transmission from a plurality of said mobile stations via a common said packet data channel;

providing at least one time slot for calling said mobile stations at cyclical intervals in said packet data channel; and setting a number of time slots allocated for calling within said macroframe for said mobile stations individually, where said mobile stations are allocated to time slots for calling on a basis of subscriber-specific profiles.

18. A computer readable storage as recited in claim 17, wherein a higher priority of a subscriber specific profile results in a higher number of respective time slots set.

* * * * *